United States Patent [19]

Greenwood

[11] Patent Number: 4,613,155

[45] Date of Patent: Sep. 23, 1986

[54] SAFETY PLATFORM ASSEMBLY FOR SANDING TRUCKS

[76] Inventor: William P. Greenwood, R.D. 1, Box 260, Crown Point, N.Y. 12928

[21] Appl. No.: 677,606

[22] Filed: Dec. 3, 1984

[51] Int. Cl.⁴ .............................................. B60R 21/00
[52] U.S. Cl. ...................................... 280/760; 105/457
[58] Field of Search .............. 280/760, 756, 5 C, 5 D, 280/5 E; 296/15, 36, 116, 181, 182, 183; 105/457

[56] References Cited

U.S. PATENT DOCUMENTS 2,188,729  1/1940  Steuber ................................. 105/457
3,891,261  6/1975  Finneman ............................. 105/457

Primary Examiner—Richard A. Bertsch
Attorney, Agent, or Firm—Heslin & Rothenberg

[57] ABSTRACT

A collapsible platform assembly secured to a hopper of a sanding truck allows an individual to safely observe and/or facilitate the loading of the truck hopper. The platform is pivotally mounted to a side of the hopper and is driven by an hydraulic actuator, powered by the hydraulic system of the truck, between a substantially horizontal, operational position, and a substantially vertical, storage position. The platform assembly also includes an integrated collapsible railing, an automatic lighting system to illuminate the platform area when the platform is in its operational position, and a warning indicator within the truck cab which is activated when the platform is not in its storage position.

19 Claims, 4 Drawing Figures

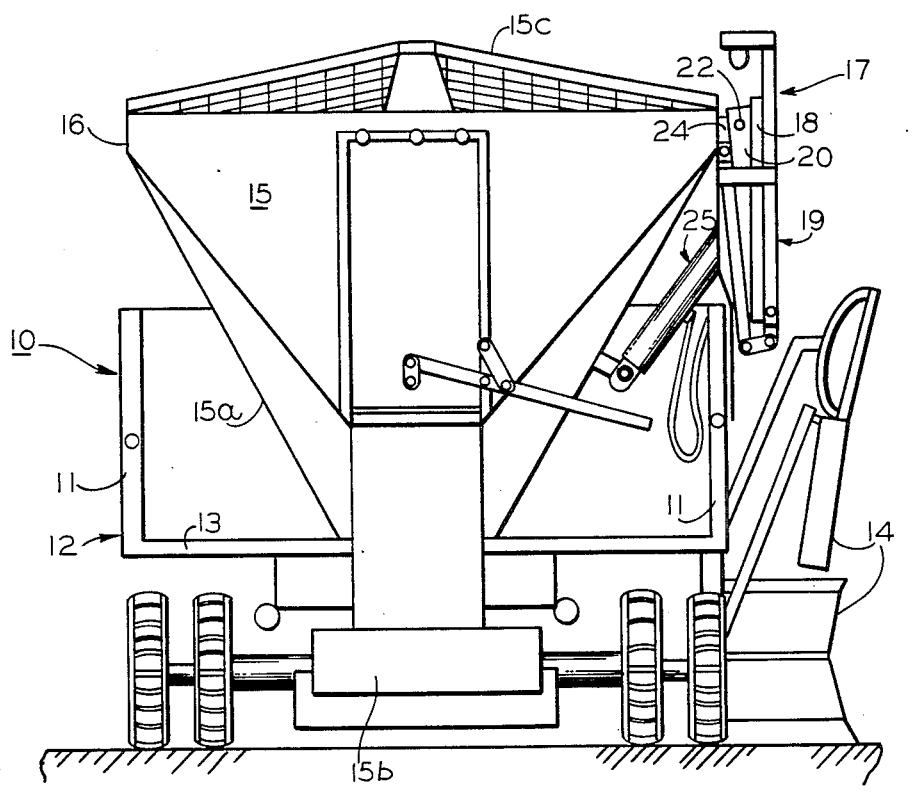
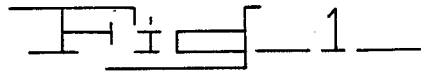

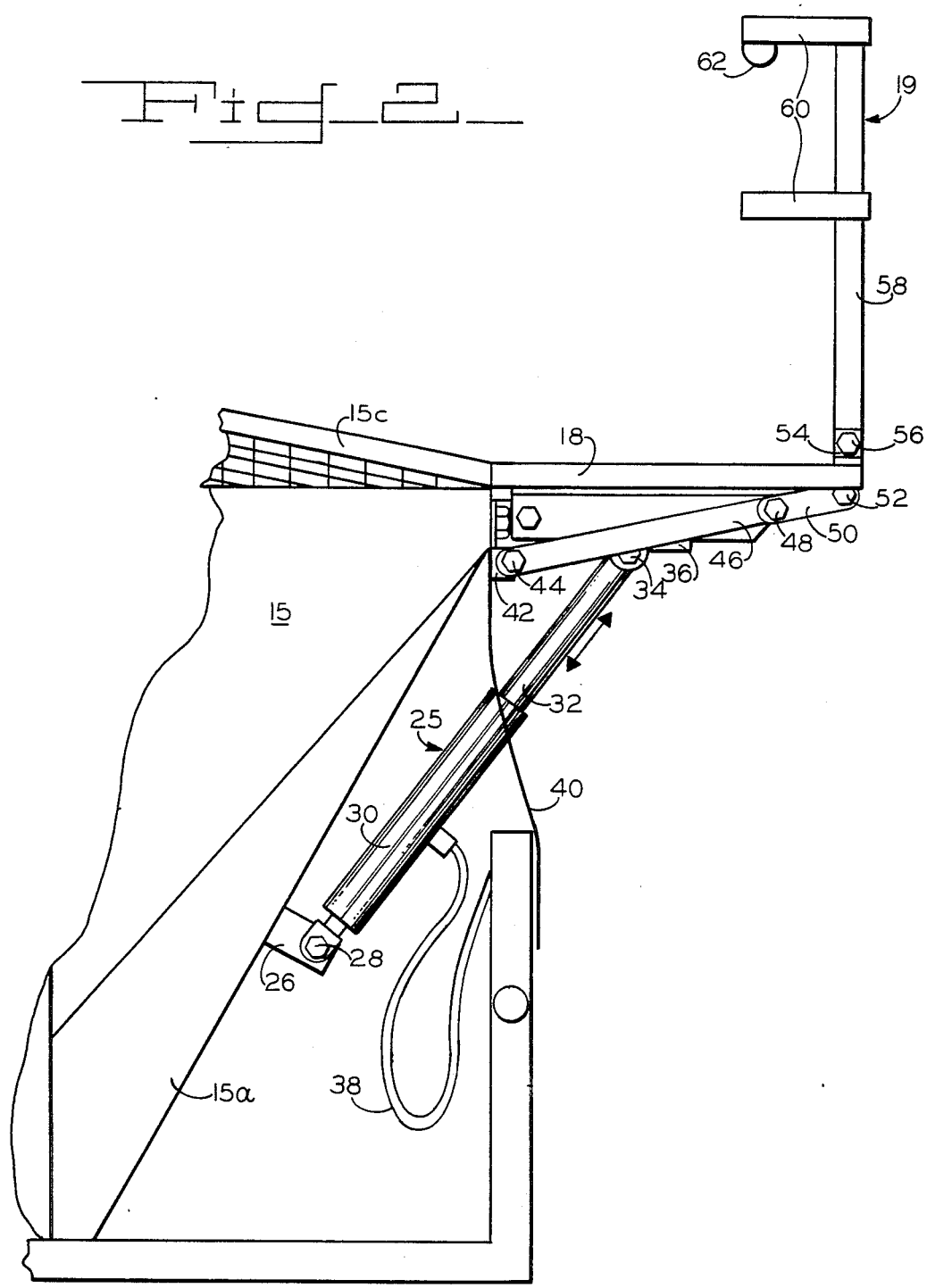

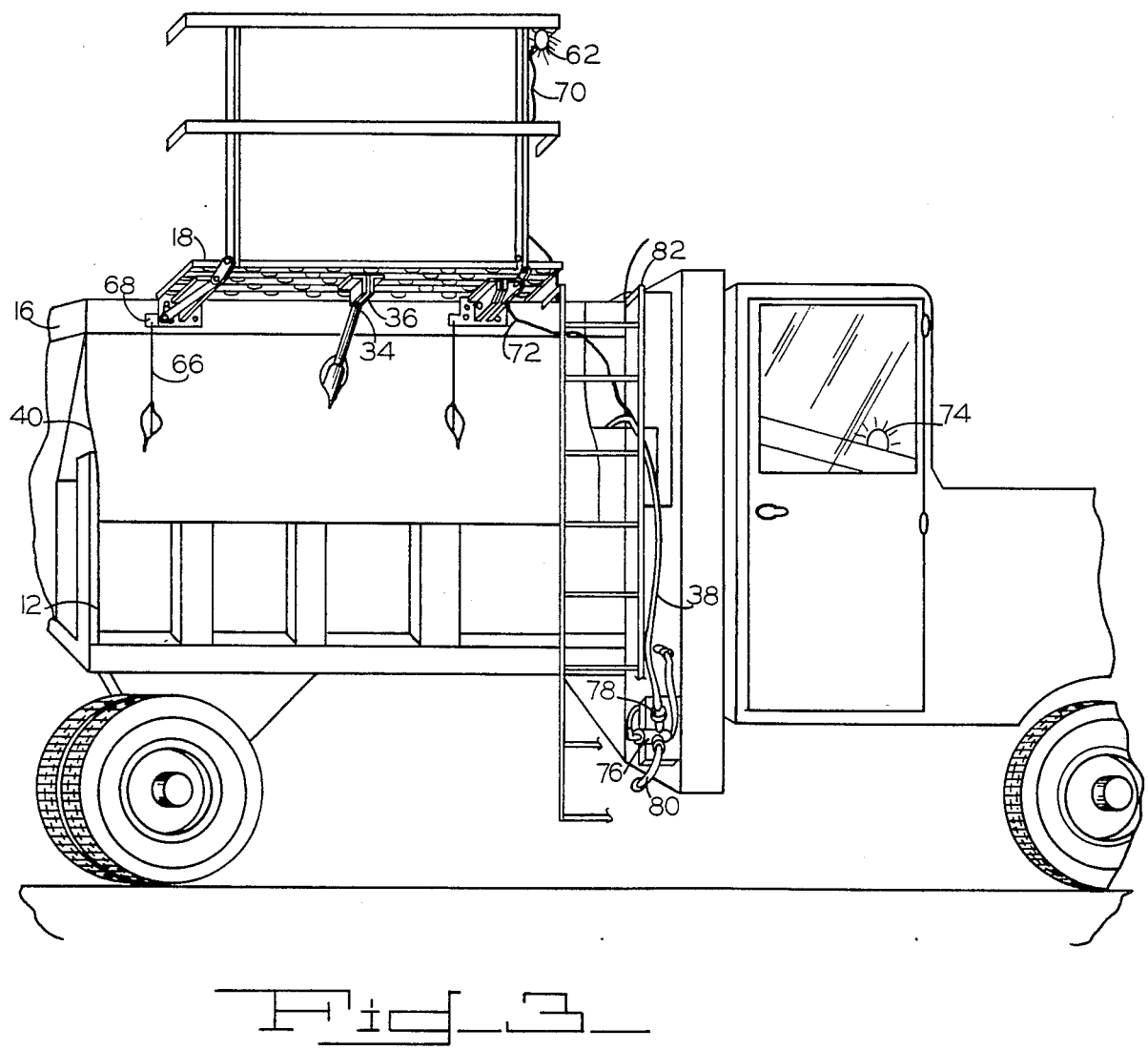

SAFETY PLATFORM ASSEMBLY FOR SANDING TRUCKS

BACKGROUND OF THE INVENTION

1. Field of the Invention

The present invention relates in general to sanding or snow trucks and more particularly to a truck mounted, safety platform assembly for such vehicles.

2. Description of the Prior Art

Winter in many parts of this country may mean hazardous driving conditions. Many states and municipalities have winter programs to disburse sand, salt, gravel or other substances onto their roadways in order to make driving conditions less hazardous. The disbursement of such materials onto roadways is generally accomplished through the use of a hopper situated in the rear of a large dump truck or similar vehicle.

A truck hopper is commonly loaded by means of a bucket loader. During the loading operation, an individual is required to be in an elevated position such that he may, by use of a shovel or other similar instrument, break up or remove undesirable formations of sand, salt, gravel or ice which become caught on a grating located on top of the hopper.

Presently an individual performs this function while standing on a very small overhang intended for protection of the truck cab. The bucket of the loader may be within inches of this individual. There is no railing on this overhang and there is no room to move back from the loading equipment. The individual operating the bucket loader may have from a poor to a completely obstructed view of the individual on this overhang. The individual on the overhang is approximately 10 feet off the ground and the logical places where such an individual would land if he was to fall from this overhang are usually occupied by a wing plow or other steel equipment. Thus an inherently dangerous situation is presented to an individual standing on this overhang attempting to observe and facilitate the loading of the hopper.

Some localities have attempted to overcome this inherent danger by employing a platform, elevated to the height of the hopper, at a fixed location. The operator of the truck maneuvers his vehicle next to this fixed platform in such a way that the platform is on one side of the hopper. An individual may then stand on this fixed platform and observe and facilitate the loading of the hopper. The drawbacks, however, associated with this attempted solution are numerous, mainly having to do with the fixed nature of the platform, and have resulted in its failure to attain widespread acceptance. Time and effort is required for the operator of the truck to carefully align the hopper across from and within reach of the fixed platform. Additional time and effort may be required by the operator of the bucket loader who must haul the material to be loaded from sand, salt or gravel piles located sometimes quite a distance from the truck hopper and stationary platform. These additional steps add to the duration and expense of the loading operation. Also if the operator of the truck is away from the loading facility and must "poke down" his load, the fixed platform at the loading facility is of no value.

Therefore, there presently exists a genuine need for a safe, practical, inexpensive, and versatile approach for allowing an individual to observe and facilitate the loading of the hopper of a sanding or snow truck.

SUMMARY OF THE INVENTION

Briefly, the present invention satisfies this need by providing a collapsible platform assembly for mounting to a side of the hopper (or body) of a truck. This assembly includes actuating means for selectively moving a preferably pivotally mounted platform between a substantially horizontal position and a substantially vertical position. In the substantially horizontal position, the platform assembly is designed and constructed to safely support an individual wanting to observe and facilitate the loading of the hopper. In the substantially vertical position, the platform assembly is unobtrusively stored at a location flush to the side of the truck hopper. The invention further contemplates: powering the actuating means from the existing hydraulic system of the truck, an integrated collapsible railing, means for automatically lighting the platform area and indicating within the truck cab when the platform is not in its storage position, and other refinements.

A primary object of the present invention is the provision of a supporting platform assembly upon which an individual performing the work of the nature referred to, will be in a safe location and will be safely supported so that he may carry out his assigned work.

Another object of the present invention is the provision of a platform assembly which is portable with the truck and therefore useful at any location, and which may be easily and simultaneously removed with the hopper from the truck, thereby freeing the truck for other uses.

A further object of the present invention is the provision of such a platform assembly which is collapsible from a substantially horizontal platform position, in which it may be used to safely support an individual, to an unobtrusive, substantially vertical position, flush with one side of the truck hopper.

A still further object of the present invention is the provision of an inexpensive platform assembly capable of safely supporting an individual desiring to perform work of the nature referred to, which is also relatively easy to construct, and install and use on existing sanding or snow vehicles.

BRIEF DESCRIPTION OF THE DRAWINGS

For a more complete understanding of the present invention and the advantages thereof, reference is now made to the following description taken in conjunction with the accompanying drawings in which:

FIG. 1 is a rear view of a sanding truck having the collapsible platform assembly of the present invention mounted thereon, with the platform shown in a substantially vertical position.

FIG. 2 is an enlarged, partial rear view of a sanding truck having the collapsible platform assembly of the present invention mounted thereon, with the platform shown in a substantially horizontal position.

FIG. 3 is a side perspective view of a truck with the collapsible platform assembly of the present invention in its raised position.

DETAILED DESCRIPTION OF THE INVENTION

Figure 4:
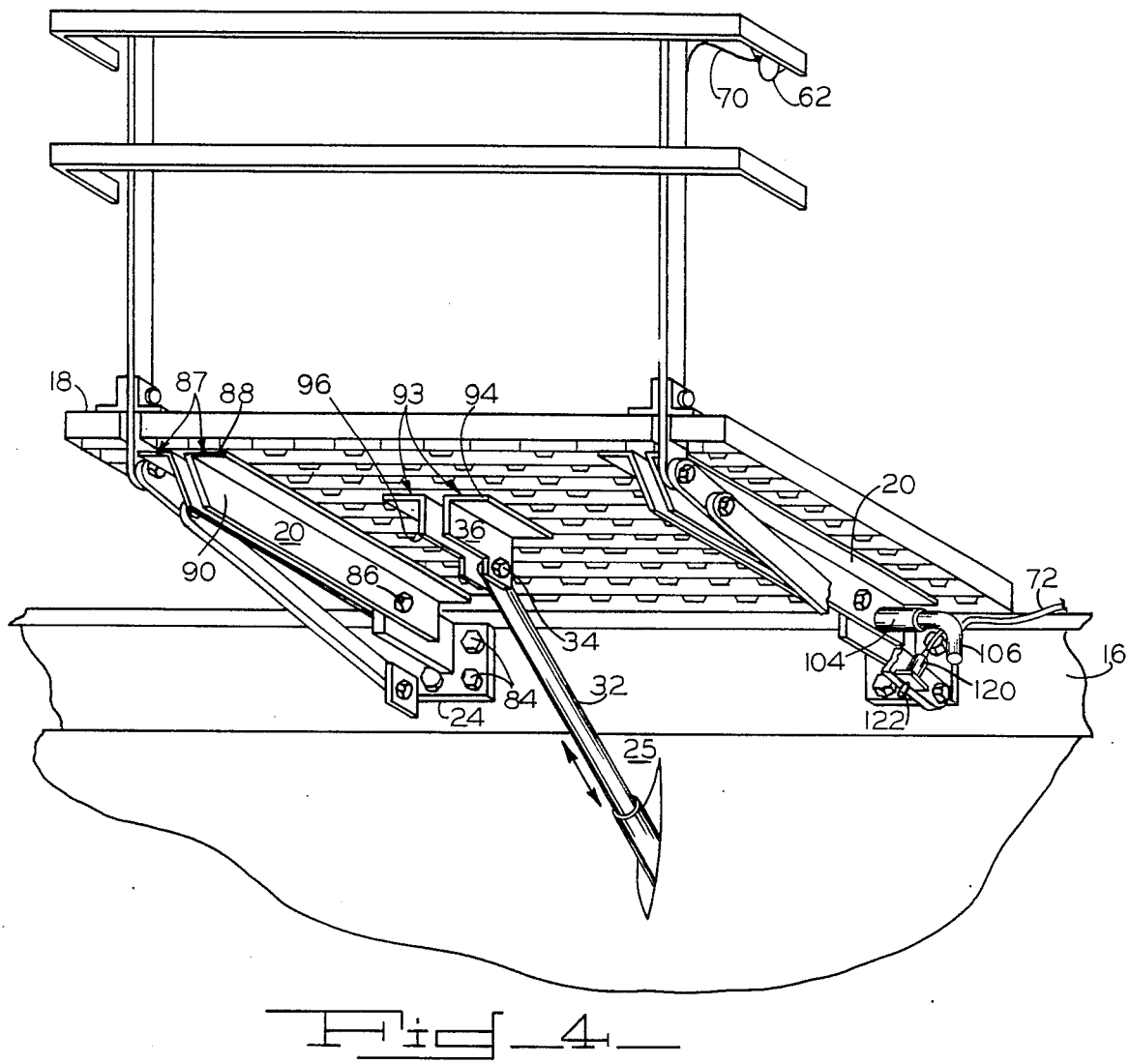
FIG. 4 is an enlarged side perspective view showing the underside of the collapsible platform assembly of the present invention.

A sanding truck 10, typical of those employed by state or municipal governments as well as some private organizations, is shown in rear profile in FIG. 1. The truck 10 has a body 12 consisting of side walls 11 and bottom bed 13, and typically has front and side wing plows 14 projecting sideways. A hopper 15 is used to disburse material onto roadways in the wintertime in order to make driving conditions on such roadways less hazardous. The hopper 15 is positioned within the truck body 12 in such a way that the vertical sides 16 of hopper 15 extend above and generally parallel to side walls 11 (hereinafter the hopper will be considered integral to the truck body). The hopper 15 has a funnel-shaped section 15a and a dispenser 15b located at the bottom of the funnel-shaped section. A grating 15c covers an open top to the hopper. The hopper 15 is loaded with sand, salt, gravel or other substances, ordinarily by means of a bucket loader. This loaded material will sift to the bottom of the hopper as a result of the hopper's funnel-shaped design and ultimately be disbursed via the dispenser 15b onto the roadways. During the loading operation for the hopper 15, large, undesirable formations of material may be caught on the grating 15c. This caught material must be manually broken up or removed, and it is to this activity which the present invention relates.

The collapsible platform assembly of the present invention, generally designated as 17, is shown mounted to a side of the hopper 15. As can be seen from FIG. 1, the platform assembly 17 may be unobtrusively stored in a substantially vertical position adjacent to the side of the truck 10, well within the sideway projection of an ordinary sanding truck having front and side wing plows 14.

Central to the platform assembly 17 is a platform 18 which preferrably is grated and pivotally mounted to a side of the hopper 15. As more fully explained below, the platform 18 has a pair of support arms 20 beneath and at opposite ends thereof which are pivotally connected by bolts 22 to T-shaped support brackets 24. The T-shaped support brackets 24 are themselves bolted to the side of the hopper 15. Platform 18 is supported and moved by a hydraulic actuator assembly 25. A railing assembly 19 is shown collapsed against the platform 18 in a substantially vertical position so as to minimize the overall sideway projection of the platform assembly 17.

The platform assembly 17 is shown in an operative condition, with platform 18 in a substantially horizontal position, in FIG. 2. Hydraulic actuator assembly 25 selectively moves platform 18 from its substantially vertically disposed storage position to this substantially horizontal position. Actuator assembly 25 consists of a hydraulic cylinder 30 anchored at one end by means of a bolt 28 to a support bracket 26 which in turn is securely bolted to the funnel-shaped part 15a of the hopper 15. From the other end of the hydraulic cylinder 30 extends a rod 32. One end of the rod 32 is connected to a piston within the hydraulic cylinder 30 and the other end is pivotally connected by a bolt 34 to a central platform support bracket 36. Hydraulic fluid flows to and from the hydraulic cylinder 30 through hose 38 which is integrated with the existing hydraulic system of the truck as will be more fully explained below. By mechanically activating or deactivating a valve connected to the hydraulic system of the truck, an individual may cause hydraulic fluid to flow to or from hydraulic cylinder 30 through hose 38. As hydraulic fluid flows to and from the hydraulic cylinder 30 the piston within hydraulic cylinder 30 will move axially in a manner well known in the art. Such movement of the piston within hydraulic cylinder 30 will cause rod 32 to extend further from, or regress further into, hydraulic cylinder 30 in an axial direction, shown generally by the double headed arrow. Note also that the hydraulic cylinder 30 protrudes slightly through a specially made hole in a depending protective sheet of metal 40 present on the side of the hopper 15, such that the hydraulic actuator assembly may operate as designed without limitations from the surrounding structure.

A protective railing assembly generally designated as 19 is shown in FIG. 2 pivotally attached by bolt 44 to a fixed bracket 42. The railing assembly is comprised of two substantially identical support arms 46 located beneath and at opposite ends of platform 18. Each support arm 46 is pivotally connected by bolt 48 to, and extended by, a smaller support arm 50. Each smaller support arm 50 is in turn pivotally connected by bolt 52 to an upright member 58. Each upright member is pivotally connected by bolt 56 to the platform 18 by means of a bracket 54 which is welded to the platform and recessed in from the outer edge of the platform so that the increase in the overall sideway projection of the platform assembly 17 due to the rail assembly 19 is minimized. Extending between, and partially around, upright members 58 are two parallel, substantially horizontal members 60. The length of extension of each substantially horizontal rail member 60 past each upright member 58 is limited by that space available, without increasing the overall sideway projection of the platform assembly, when the platform assembly 17 is in the substantially vertical position. Attached to one end of the top horizontal member 60 is a light 62 for lighting the platform 18 and the grating 15c on top of the hopper (hereinafter collectively known as the platform area). Since railing assembly 19 is connected via bracket 54 to the platform 18, selective movement of the platform 18 will simultaneously move the railing assembly between a collapsed position flush with the side of the truck 10 and an extended position as shown in FIG. 2. In its extended position, the railing assembly protects an individual standing on the platform 18 from accidentally falling off the platform. The platform area light 62 provides further safety for an individual standing on the platform 18 by improving the individual's ability to visually perceive the platform area.

The platform itself will preferably be rectangular in shape, approximately three feet wide and extending substantially the length of the hopper 15; thus, allowing an individual flexibility in positioning himself so as best able to safely break up or remove undesirable formations of sand, salt, gravel or ice which may become caught anywhere on the grating 15c. Also the platform 18 will preferably be grated. A grated platform will allow material to harmlessly fall from the platform which will in turn prevent excessive buildup of materials on the platform, thus allowing an individual to maintain his balance and traction while standing on the platform during the loading operation of the hopper. The platform 18 could be constructed of any suitable material (e.g. sufficiently strong metal) to allow it to be used to support the weight of one or more individuals.

In FIG. 3 the protective sheet of metal 40 which depends from the side of the hopper over the external body of the truck is more clearly shown. The hopper 15 may be anchored to the body 12 of the truck by means of four substantially identical rods 66, two on each side of the hopper. Each rod 66 has one end (not shown) affixed to the body 12 of the truck, and the other end secured to a fixed bracket 68 attached to the side 16 of the hopper 15. As discussed earlier, the hydraulic actuator assembly 25 is pivotally attached by bolt 34 to bracket 36, centrally located beneath and secured to the platform 18. The platform area light 62 has a lead 70 which is secured to the rail assembly 19 and runs to a contact switch 120 located beneath the platform 18 as will be illustrated in the enlarged view of FIG. 4. Two leads 72 wound together by means of tape, extend downward from the contact switch 120. One lead is for the platform area light 62 and the other is for a warning light 74 to be located within the cab of the truck. The contact switch 120 will automatically activate the platform area light 62 and the warning light 74 when the platform is not in its substantially vertical position.

As best seen in FIG. 3, the hydraulic actuator assembly 25 is provided with hydraulic fluid by the tapping of the existing hydraulic system 76 on the sanding truck 10. A single acting valve 78 is connected to the hydraulic system 76, permitting hydraulic fluid to flow to and from the hydraulic actuator assembly 25 via hose 38. Hydraulic fluid flow to and from the hydraulic actuator assembly 25 is controlled by an individual through manipulation of lever 80.

Also shown in FIG. 3, is a ladder mounted on the side of the truck 10. The ladder 82, which is a common feature of sanding trucks 10, allows easy access to the platform 18.

An enlarged side perspective view from the underside of platform 18 is shown in FIG. 4. As noted earlier, two identical T-shaped brackets 24 located beneath and at opposite ends of the platform 18 are bolted to the hopper 15. Each T-shaped bracket 24 is bolted to hopper side 16 by means of four identical bolts 84. The protruding leg of each T-shaped bracket is connected to a platform support arm 20, by means of a bolt 86. Each bolt 86 is sufficiently loose to allow the platform support arms 20 to pivot in relation to the fixed T-shaped brackets 24. The platform 18 may thus be pivotally moved between a substantially vertical position and a substantially horizontal position by selective activation of the hydraulic actuator assembly 25.

Each support arm 20 is comprised of two L-shaped support members 87 spaced from and substantially parallel to each other, but facing in opposite directions. One leg 88 of each L-shaped support member 87 is welded to the underside of platform 18. The other leg 90 of each support member 87 depends from the underside of platform 18. The space between these depending portions of the support members is sufficient to receive the protruding leg of the respective T-shaped support brackets 24. A bolt receiving hole is drilled in each depending leg 90 along substantially the same axis. The platform 18 is attached at each end to a T-shaped bracket 24 by passing a bolt 86 through drilled holes and through a preformed bolt receiving hole in the protruding leg of each T-shaped bracket 24. The other end of support arms 20 is configured so as to engage sheet-metal 40 on the side of the hopper when the platform is in the substantially vertical position in such a way as to minimize the overall sideway projection of the platform assembly 17.

As noted earlier, the hydraulic actuator assembly 25 has a rod 32 pivotally connected by bolt 34 to a centrally located platform support bracket 36. The centrally located platform support bracket 36 is comprised of two support members 93 spaced from and substantially parallel to each other but facing in opposite directions. The two support members each have a leg 94 welded to the underside of platform 18. Support members 93 also have two depending substantially L-shaped legs 96 distanced so as to form a space sufficient to receive the end of rod 32. Depending legs 96 have bolt receiving holes drilled substantially along the same axis and the end of rod 32 is pivotally connected to them by passing a bolt 34 through the drilled bolt-receiving holes on each depending leg and through a preformed hole in the end of rod 32.

A lock assembly 104 is also shown in FIG. 4. The lock assembly 104 is mounted on one of the depending support legs 90 beneath one end of platform 18. The lock assembly 104 has a manual crank 106 which, by turning 90 degrees, will release a spring loaded member from the lock assembly 104 into a preformed receiving hole in the protruding leg of the fixed T-shaped bracket 24. Through the coupling of the spring loaded member from the lock assembly 104 with the protruding leg of the T-shaped bracket, the platform 18 will be prevented from pivoting at bolt 22 and thus may be secured into a substantially horizontal position.

Lastly, the electrical contact switch 120 is shown. When the platform assembly 17 is in the substantially vertical position the contact button 122 will be compressed against the side 16 of the hopper 15. Compression of contact button 122 will cause an interruption in the electrical circuit for the platform area light 62 and the warning light within the cab 74. Conversely, movement of platform assembly 17 away from the substantially vertical position will release contact button 122 causing the completion of the electrical circuit for the platform area light 62 and the warning light within the cab 74. Thus, if the platform assembly is not in the substantially vertical, travel position, the warning light within cab 74 will be on, cautioning an individual to examine the platform assembly 17 before moving the truck 10. Also, anytime the platform assembly 17 is in the substantially horizontal position, the platform area light 62 will be on providing added safety for an individual wishing to use the platform assembly 17.

To summarize, during the usual loading operation of the sanding truck 10, the truck will be positioned near a pile of sand, salt, gravel or other material to be loaded into the hopper. After positioning of the truck, an individual can activate the hydraulic actuator assembly 25 by manual manipulation of lever 80, forcing hydraulic fluid to flow via hose 38 into hydraulic cylinder 30, which in turn will cause movement of the piston within hydraulic cylinder 30 and an increase in extension of rod 32 from hydraulic cylinder 30. By increasing the extension of rod 32 from hydraulic cylinder 30 the platform 18 will move from a substantially vertical position towards a substantially horizontal, operating position. When the platform reaches its substantially horizontal position the individual will activate lock assembly 104 in order to safely secure the platform in its substantially horizontal position. The individual may then climb the ladder 82 and step onto the platform 18 to observe and facilitate the loading of the hopper. In the substantially horizontal position, the platform area light 62 and the warning light within the cab 74 will be on, and the railing assembly 19 will be extended, offering additional safety to the individual on the platform. Upon completion of the loading operation, the individual will climb back down ladder 82 and release the safety lock assembly 104. The hydraulic actuator assembly 25 may then be deactivated via manipulation of lever 80, causing movement of platform assembly 17 to its substantially vertical, travel position.

It will be noted that this invention fully meets the objectives set forth. A supporting platform assembly is provided upon which an individual wishing to observe and facilitate the loading of a hopper may stand at a safe location and be safely supported during such loading operation. Also, it will be noted that the disclosed platform assembly is portable with the truck, thus may be used at any location, and may be easily and simultaneously removed with the hopper from the truck once certain easy disconnections are made. Additionally, it is evident that the platform assembly is collapsible from a substantially horizontal position, in which it is designed to safely support an individual, to an unobtrusive, substantially vertical travel position, flush with a side of the truck. Lastly, it will be observed that the platform assembly of the present invention may be constructed of inexpensive materials and would be relatively easy to construct, and install and use on existing sanding vehicles.

Although one embodiment has been illustrated in the accompanying drawings and described in the foregoing detailed description, it will be understood that the invention is not limited to the embodiment discussed but is capable of numerous rearrangements, modifications, and substitutions without departing from the scope of the invention. For example, the platform assembly might, under appropriate circumstances be mounted directly to a side wall of the truck body rather than to the side of the hopper. Other changes, within the scope of the invention as defined by the appended claims, will suggest themselves to those versed in this art.

I claim:

1. A collapsible platform assembly for external mounting to a side of a hopper of a truck for supporting an individual in an elevated position such that the individual can safely observe and facilitate the top loading of the truck hopper, comprising:
   a platform capable of supporting the weight of an individual;
   means for mounting the platform to an external side the truck hopper; and
   power driven actuating means for selectively moving the platform between a substantially horizontal position and a substantially vertical position, in its substantially horizontal position the platform being employed to support an individual at a safe location near a top opening of the truck hopper and in its substantially vertical position the platform extending below said mounting means and being stored unobtrusively at a location adjacent to said side of the truck hopper.

2. A collapsible platform assembly as recited in claim 1, wherein the truck hopper comprises a generally funnel shaped hopper, used for dispersing sand, salt or other materials onto a roadway and said mounting means comprises means for mounting the platform to a substantially vertically oriented side of said hopper.

3. A collapsible platform assembly as recited in claim 2, wherein the mounting means comprises means for pivotally connecting the platform to said side of the truck hopper.

4. A collapsible platform assembly as recited in claim 3, wherein the platform is grated.

5. A collapsible platform assembly as recited in claim 3, wherein the actuating means comprises a hydraulic actuator anchored at one end to the truck hopper.

6. A collapsible platform assembly as recited in claim 5, wherein the hydraulic actuator comprises:
   a hydraulic cylinder;
   a rod, one end of which is connected to a piston within the hydraulic cylinder, the other end of which is secured to the platform; and
   means for actuating the hydraulic cylinder, such that increasing the extension of the rod from the hydraulic cylinder will move the platform towards its substantially horizontal position and regression of the rod into the hydraulic cylinder will move the platform towards its substantially vertical position.

7. A collapsible platform assembly as recited in claim 6, wherein the truck has a hydraulic system and the actuating means for the hydraulic cylinder comprises:
   a valve connected to a live line of the hydraulic system of the truck;
   means connecting the valve to the hydraulic cylinder such that hydraulic fluid may flow between the valve and the hydraulic cylinder when the valve is actuated; and
   means for actuating the valve.

8. A collapsible platform assembly as recited in claim 5, further comprising means for locking the platform in the substantially horizontal position.

9. A collapsible platform assembly as recited in claim 5, further comprising a pivoted railing coupled to the platform such that the rail is fully extended when the platform is in the substantially horizontal position, to protect the individual from falling, and is collapsed against the platform when the platform is in the substantially vertical position, to be unobtrusively stored adjacent to said one side of the truck body.

10. A collapsible platform assembly as recited in claim 2, further comprising means for automatically indicating within a cab of the truck when the platform is in the substantially horizontal position.

11. A collapsible platform assembly as recited in claim 2, further comprising means for automatically lighting the platform area when the platform is in the substantially horizontal position.

12. A collapsible platform assembly mounted onto one side of a truck hopper for supporting an individual in an elevated position such that individual can safely observe and facilitate the loading of the hopper, comprising:
   a platform capable of supporting the weight of an individual;
   means for mounting the platform onto one side of the truck hopper; and
   non-manual actuating means for selectively moving the platform between a substantially horizontal position and a substantially vertical position, in its substantially horizontal position the platform supports an individual at a safe location relative to the hopper and in its substantially vertical position the platform extends lower than said mounting means and is stored unobtrusively at a location proximate to said one side of the truck hopper.

13. A collapsible platform assembly as recited in claim 12, wherein the mounting means comprises means for pivotally connecting the platform to one side of the truck hopper.

14. A collapsible platform assembly as recited in claim 13, wherein the actuating means comprises:
- a hydraulic cylinder anchored at one end to the truck hopper;
- a rod, one end of which is connected to a piston within the hydraulic cylinder, the other end of which is secured to the platform, such that increasing the extension of the rod from the hydraulic cylinder will move the platform towards its substantially horizontal position and regression of the rod into the hydraulic cylinder will move the platform towards its substantially vertical position;
- a valve connected to a live line of a hydraulic system of the truck;
- means connecting the valve to the hydraulic cylinder such that hydraulic fluid may flow between the valve and the hydraulic cylinder when the valve is actuated; and
- means for actuating the valve.

15. A collapsible platform assembly as recited in claim 14, further comprising means for locking the platform in the substantially horizontal position.

16. A collapsible assembly platform as recited in claim 13, further comprising a pivoted rail coupled to the platform such that the rail is fully extended when the platform is in the substantially horizontal position, to protect the individual from falling, and is collapsed against the platform when the platform is in the substantially vertical position, to be unobtrusively stored adjacent to said one side of the truck hopper body.

17. A collapsible platform assembly as recited in claim 13, further comprising means for automatically indicating within a truck cab associated with the truck hopper when the platform is in the substantially horizontal position.

18. A method of providing a safe support from which an individual can observe and facilitate the top loading of the hopper of a truck which comprises:
- pivotally mounting a platform capable of supporting an individual to an exterior side of a truck hopper;
- storing the pivotally mounted platform in a substantially vertical position adjacent said one side of the hopper with the platform extending downward relative to its pivotal mounting;
- providing power driven actuating means for moving the platform from said downwardly extending substantially vertical position to a substantially horizontal position near the top of the hopper, whereby in its substnatially horizontal position the platform can be employed to support an individual at a safe location relative to the hopper.

19. The method of claim 18 further including the steps of:
- providing locking means for securing the platform in the substantially horizontal position; and
- providing a pivoted railing coupled to the platform such that the railing automatically fully extends and is substantially vertically oriented when the platform is in the substantially horizontal position, to protect the individual from falling, and collapses against the platform when the platform is in the substantially vertical position, to be unobtrusively stored alongside said platform.

* * * * *